June 13, 1961 A. L. ROGERS 2,988,395
LOAD CARRYING AND AUTOMATIC LOAD RELEASING DEVICE
Filed Oct. 14, 1957 2 Sheets-Sheet 1

INVENTOR.
ARTHUR LEE ROGERS
BY

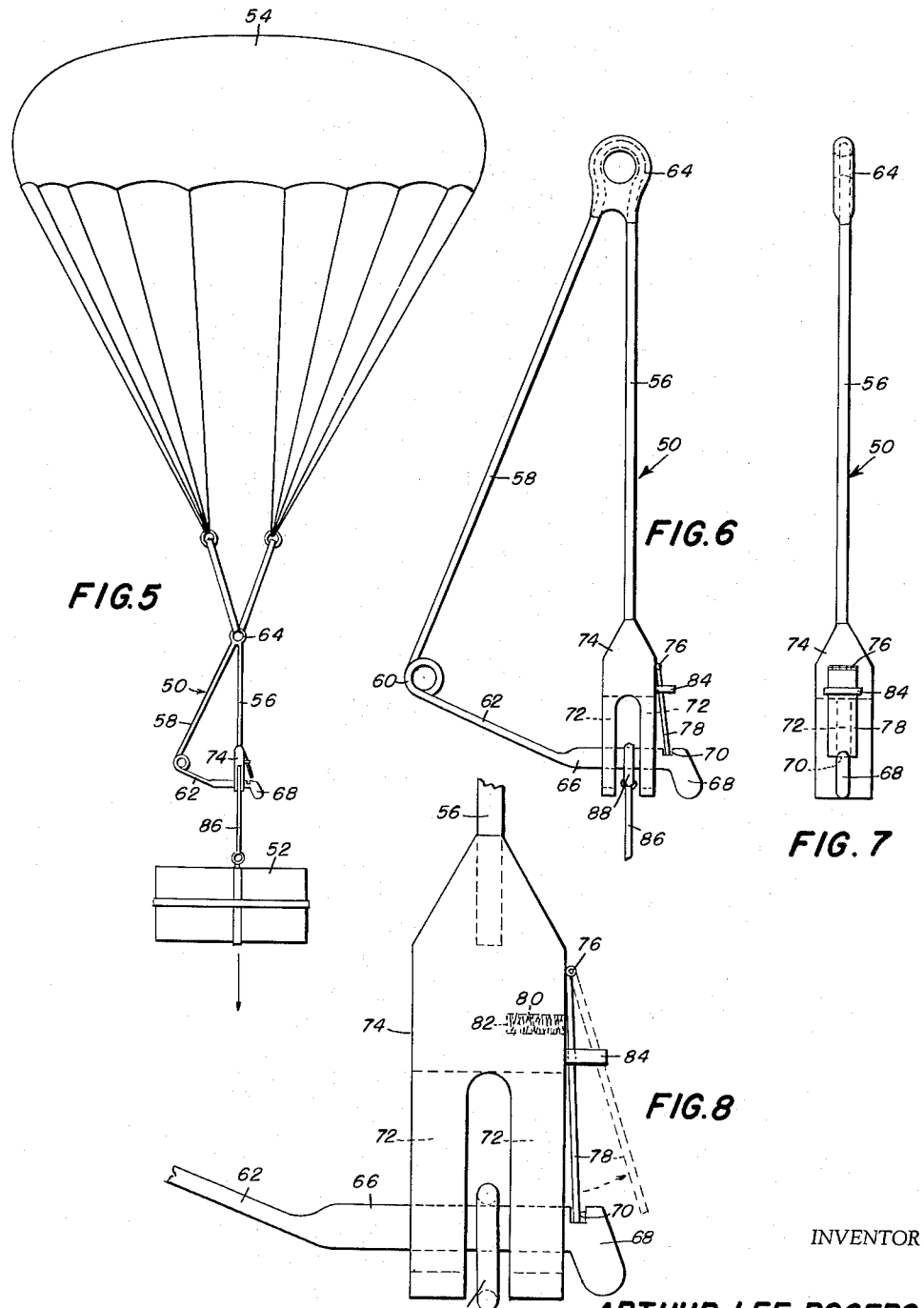

2,988,395
LOAD CARRYING AND AUTOMATIC LOAD RELEASING DEVICE
Arthur L. Rogers, 240 York St., Vallejo, Calif.
Filed Oct. 14, 1957, Ser. No. 689,934
17 Claims. (Cl. 294—83)

This invention relates to releasable attachments for connecting a load to a line, and it particularly relates to such attachments which are maintained in closed connecting position by the weight of the load and which are automatically unlocked to release the load when the weight of the load no longer exerts a force thereon.

Automatically-releasable connecting means of the above type are useful in many different applications; for example in attaching a sinker of the jettisonable type to a fishing line, attaching a load to a parachute, connecting a load to a hoist, etc. Because of the obvious utility of this type of device, various previous attempts have been made to provide an effective device capable of performing this function. However, none of these prior devices were sufficiently effective to achieve the purpose either because they would not easily or quickly release the load when necessary or were so complicated and bulky that they were difficult to handle and expensive to manufacture and maintain.

It is one object of the present invention to overcome the above as well as other defects of the prior art by providing a connecting device which quickly and easily releases the load when the weight of the load is removed although maintained completely closed while the load's weight acts thereon.

Another object of the present invention is to provide a connecting device which is simple and easy to use.

Other objects of the present invention are to provide an improved connecting device, of the character described, that is easily and economically produced, which is sturdy in construction, and which is highly effective in operation.

With the above and related objects in view, this invention consists in the details of construction and combination of parts, as will be more fully evident from the following description, when read in conjunction with the accompanying drawings in which:

FIG. 5 is a side elevational view of a second embodiment of the present invention, the device being illustrated as attached to a parachute, and held in closed position by the weight of a load.

FIG. 6 is an enlarged, detailed, side elevational view of the connecting device of FIG. 5 in closed position.

FIG. 7 is an end elevational view of the device of Fig. 6.

FIG. 8 is an enlarged, fragmentary, side elevational view of the releasable locking elements of FIG. 6.

Figure 1:
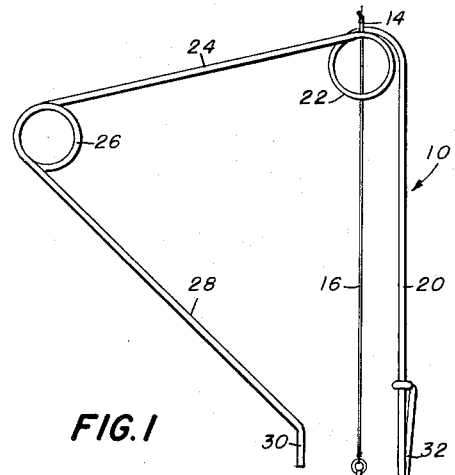
FIG. 1 is a side elevational view of one embodiment of the present invention, the device being shown in open position.
Figure 2:
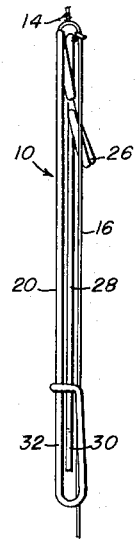
FIG. 2 is an end elevational view of the device of FIG. 1.
Figure 3:
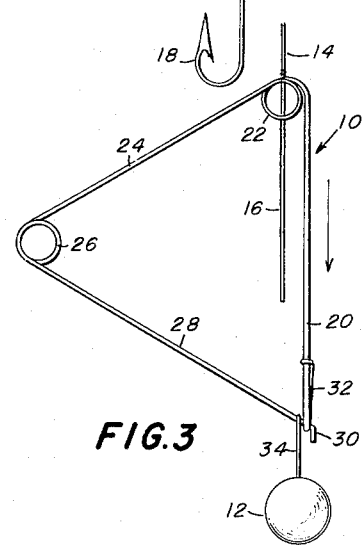
FIG. 3 is a view somewhat similar to FIG. 1, but showing the device maintained in closed position by a load.
Figure 4:
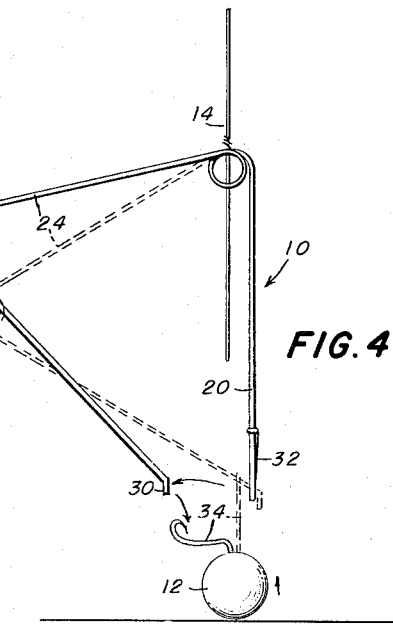
FIG. 4 is a view similar to FIG. 3, but showing the device in the act of being opened by the removal of the weight of the load therefrom.

Referring now in greater details to the drawings wherein similar reference characters refer to similar parts, there is shown in FIGS. 1–4, a connecting device generally designated 10. The connecting device 10 is particularly suited to attach a sinker to a fishing line although it may also be used for various other purposes. As an attachment for a fishing line, its utility lies in releasably connecting a sinker, such as shown at 12, to the leader line 14 from which depends the hook line 16 and hook 18.

The automatically releasable connecting device indicated at 10 in FIGS. 1 to 4, and at 50 in FIGS. 5 to 8, when in closed, load carrying position, are substantially triangular in form and are formed of a continuous strip of spring material, and consist each of a supporting leg 20 or 56 continuing from the upper end into an outwardly and downwardly inclined retractor leg 24 or 58 which in turn continues into an inwardly and downwardly inclined load carrying leg 28 or 62, and the inherent resiliency within and between the support leg and retractor leg normally urges these legs to a predetermined degree of divergence, while the retractor leg and load carrying leg are normally urged to a predetermined degree of convergence.

As illustrated in FIGS. 1 to 4, the strip is formed into a coil at each connection between the legs for increased resiliency, as indicated at 22 and 26, while in FIGS. 5 to 8, the strip is merely bent to form an eye at the juncture of the supporting leg and retractor leg, as indicated at 64, while the junction between the retractor leg and load carrying leg is formed by a coil as indicated at 60.

The support leg terminates at its lower end in a loop having a bottom cross member as indicated at 32 in FIGS. 1 to 4, or at 72 in FIGS. 5 to 8, while the end of the load carrying leg terminates in a latch portion 30 or 66, with the end bent down to engage over the bottom cross member of the loop.

Normally the device assumes the position approximately shown in FIG. 1 due to the inherent resiliency of the device, with the retractor leg swung to an increased angle from the support leg, and the load carrying leg at a decreased angle from the retractor leg, whereby, through manual depression of the retractor leg, the terminal end of the load carrying leg will pass through the loop or eye of the support leg in a position to engage over the cross member.

If a load such as the sinker 12 is arranged on the load carrying leg by a line 34, close to the latch portion before insertion of the latch portion in the loop without applying the load thereto, the latch portion will pass through the loop upon depression of the retractor leg; then, if the device is lifted by the eye 22 or 64, the load will draw the latch portion into engagement over the cross member and the load will maintain the members latched together until the load becomes unsupported by the load carrying leg, therefore that leg will be retracted upwardly out of engaging position through the resiliency of coils 26 or 60, or through the inherent resiliency of the device, and, simultaneously the retractor leg will swing outwardly from the support leg to withdraw the latch portion from the loop and thus free the weight.

When the attachment 10 is used in fishing, it is lowered straight down. It is usually used when fishing from a boat or barge in deep water. The sinker is used to get the baited hook to the bottom as quickly as possible. As soon as the sinker 12 strikes the bottom, its weight is released, and the sinker drops off. This permits the baited hook to drift freely about just as though the bait was naturally moving about. If the fisherman wishes to release the sinker before it reaches bottom, he may simply exert a slight upward jerk which is instantly followed by a slackening of the line. This will momentarily release the pull of the weight on the leg 28 permitting leg 28 to spring up, and leg 20 to spring outwardly away from leg 28 to thus drop the sinker 12. The sinker 12 should, of course, be of the disposable type and may actually take the form of a rock, bag of sand, old piece of iron or the like.

The modified form illustrated in FIGS. 5 to 8 and indicated at 50 is useful for attaching heavier loads and for use under more rugged conditions, and is illustrated as connecting a load 52 to a parachute 54.

The connecting device 50 is hereby described in more explicit detail and comprises a spring rod preferably made of spring steel or the like, which is bent to form two angularly positioned legs 56 and 58; the leg 56 being the support leg similar to leg 20, and the leg 58 being the retractor leg similar to leg 24. The bottom end of leg 58 is integrally connected by coil 60 to load-bearing leg 62. The apex formed between the legs 56 and 58 is strengthened by a cast steel overlapping member 64 to which the parachute lines are attached.

The free end of leg 62 is provided with an enlarged load-bearing male pin 66 preferably made of cast steel or the like having a hook portion 68 at its end. On the upper surface of the pin 66, adjacent the hook portion 68 is a notch 70. The male pin 66 is adapted to be inserted through mating female slots 72 in the tines of a fork member 74, preferably made of cast steel or the like and connected to the bottom of the leg 56. However, the pin 66 is biased out of and away from the fork member 74 by the spring action of the leg 58.

Pivoted to the fork member 74, as at 76, is a safety-latch finger 78. This latch finger is biased away from the fork member 74, toward the dotted line position shown in FIG. 8, by a coil spring 80 positioned in a recess 82 in the fork member 74. A curved stop member 84 is attached at its respective ends to fork member 74 and encircles the finger 78, and acts to limit the outward swinging movement of the finger 78 to the position indicated by the dotted lines in FIG. 8.

In operation, the male pin 66 is partly inserted through the first female slot 72 in fork member 74 until the latch portion 68 lies within the space between the tines of the fork member. The load 52 is then attached to the pin 66 by means of line 86 and ring 88 connected thereto; the ring 88 being slipped over the pin 66.

The male pin 66 is then drawn through the second female slot 72 in the other tine of the fork member 74 into the position shown in FIG. 8. In this position the finger 78 automatically engages in notch 70 because the tension of leg 62 carrying pin 66 is upward and the tension of leg 50 carrying fork member 74 is outward; consequently notch 70 will engage finger 78 and pull the finger 78 back with it until pin 66 is stopped by safety latch finger 78 abutting the fork member 74.

The device 50 will retain its above-described latched position, wherein the latch finger 78 acts as a safety latch until the full weight of the load comes to bear on the load pin 66. This may be when the assembly is released from an airplane or when the load is otherwise allowed to fall free.

When this happens, the weight of the load pulls the pin 66 down against the bottom of the slots 72 in the fork member 74 and thereby releases the finger 78 from the notch 70; permitting the spring 80 to swing the finger 78 to the inoperative position shown in dotted outline in FIG. 8. The device is now held locked only by the weight of the load, holding the load carrying male pin 66 down in the bottom of female slots or eyelets 72 and also holding latch portion 68 of pin 66 abutting the side of fork member 74 so that when the weight of the load is withdrawn, the device will automatically spring open to release the load because leg 62 and pin 66 with offset latch portion 68 move upward, letting leg 56 and fork member 74 move outwardly therefrom. This happens for example, when the parachute reaches the ground and the weight of the load is borne by the ground.

If desired, a hook can be substituted for ring 88 so that it is possible to first fully insert the pin 66 through the fork member 74 and then hook the load to the pin by snapping the hook around the pin 66 in the space between the tines of the fork member 74. However, such hooked engagement might cause accidental release of the load; consequently the use of the ring 88 or the like is preferred.

Although this invention has been described in considerable detail, such description is intended as being illustrative rather than limiting, since the invention may be variously embodied, and the scope of the invention is to be determined as claimed.

Having thus set forth and disclosed the nature of this invention, what is claimed is:

1. A load carrying and automatic load releasing device comprising a female receiving means and a male insertable means resiliently connected to each other in such manner that the insertable means and the receiving means are normally biased away from each other, said insertable means being biased upwardly from the bottom of said receiving means and said receiving means being biased outwardly away from said insertable means, said insertable means having a downwardly offset engagement element to latchingly engage with said receiving means, said insertable means also being adapted to support a load, the engagement element of said insertable means being constructed to latchingly engage with said receiving means under the force exerted on said insertable means by the weight of said load, and said engagement element being releasable from said receiving means by the biasing action of said insertable means and said receiving means when the weight of said load is removed from said male insertable means.

2. The device of claim 1 wherein said engagement element is a bent, offset portion connected to a first spring leg, and wherein said receiving means is an eyelet connected to a second spring leg resiliently connected to said first spring leg.

3. A load carrying and automatic load releasing device comprising a first spring leg and a second spring leg, said first spring leg having one end resiliently connected to one end of said second spring leg through an apex portion, a third spring leg having one end resiliently connected to the other end of said second spring leg, an offset engagement element on the free end of said third spring leg, a female reception means on the free end of said first spring leg through which the engagement element is adapted to pass and with which it is adapted to engage, and said third spring leg being resiliently biased in a direction to move said engagement element upwardly away from the bottom of said female reception means, while said first spring leg is biased in a direction to move said reception means outwardly away from said engagement element.

4. The device of claim 3 wherein said engagement element is a downwardly offset end on said third spring leg, and wherein said reception means is an eyelet depending from said first spring leg.

5. The device of claim 3 wherein said engagement element is a pin connected to said third spring leg, said pin having its offset portion at its free end, and a notch formed adjacent said offset portion, and wherein said receiving means is a fork member connected to said first spring leg, said fork member having transverse slots to receive said pin and also having a safety latch means releasably engageable in said notch.

6. The device of claim 3 wherein said engagement element is a pin connected to said third spring leg and having an offset portion on the free end and a notch formed in said pin adjacent the offset portion, and wherein said reception means is a slotted fork member connected to said first spring leg in a position to receive said pin through the slotted portion thereof, said fork member having a latch finger insertable within the notch on said pin but resiliently biased away therefrom, said pin being biased into engagement with said latch finger by the biasing action of said third spring leg.

7. The device of claim 3, wherein said apex portion is provided with a reinforcing element.

8. A structure as defined in claim 3 in which said female reception means comprises a pair of spaced loops with the load appliacble to the third spring leg between the spaced loops for increased load carrying capacity.

9. A structure as defined in claim 3 in which said female reception means comprises a pair of spaced loops with the load applicable to the third spring leg between the spaced loops for increased load carrying capacity, said third spring leg having a latch portion and said latch portion having a notch formed in the top surface, a leaf spring fixed at one end on the follow one of said spaced loops for engagement of the other end in said notch to retain the latch portion within the loops, and for releasing said latch portion for retraction from the loops for release of the load when the weight thereof is eased from the third spring leg.

10. A structure as defined in claim 3, said female reception means comprising a pair of axially spaced loops for application of load attaching means therebetween to said free end during insertion for support of heavy loads.

11. A structure as defined in claim 3, said offset engagement element having a top wall having a recess formed therein, and a leaf spring having its upper end fixed to said first spring leg with the other end engageable in said recess to retain said offset engagement element within the female reception means until the load is applied and being releasable through freeing of the load on the third spring leg for release of the load.

12. A load carrying and automatic load releasing device comprising a first spring leg and a second spring leg, said first spring leg being resiliently connected at one end to the corresponding end of said second spring leg, a third spring leg, the opposite end of said second spring leg being resiliently connected to the corresponding end of said third spring leg, the connections of each of said legs to each other being through integral coils, an offset portion on the free end of said third spring leg, an eyelet depending from the free end of said first spring leg, and said third spring leg being resiliently biased through its coil connection with said second leg into a position where it holds said offset portion spaced upwardly from the bottom of said eyelet, said eyelet on said first spring leg being biased outwardly away from said offset portion of said third spring leg, said offset portion being insertable through and into engagement with said eyelet and being maintainable in said engagement by the weight of a load connected to said third spring leg.

13. A load carrying and automatic load releasing device comprising first, second, and third spring legs connected to each other in end to end series in the general form of a triangle, said first spring leg having a fork member at its free end comprising a pair of tines, a female slot in each tine coinciding with each other, said slots being positioned in a common plane transverse to the space between the tines, a latch finger pivotally connected to said fork member, a spring on said fork member engaging said latch finger and urging said latch finger into swinging movement away from said fork member, a stop on said fork member limiting the swinging movement of said latch finger away from said fork member, said third spring leg having a male pin on its free end and terminating in an offset engagement element, said male pin and said engagement element being insertable through the slots in the tines of said fork member with said engagement element engaging said fork member, a notch in said pin adapted to receive the end of said latch finger, and said third spring leg being resiliently biased into a position to maintain engagement between said latch finger and said notch.

14. An automatically releasable disconnecting device comprising a vertical support leg terminating at its lower end in a cross member in turn terminating in an upright portion, a retractor leg projecting angularly from the upper end of said support leg and an eye formed at the juncture therebetween for attachment of lifting means, and a load carrying leg projecting toward said lower end and normally spaced therefrom and having connection with said retractor leg, said load carrying leg terminating in a latch portion to engage said cross member upon application of a load thereto, said load carrying leg being manually operable to advance said latch member over said cross member, and returning to said normally spaced position when the load is released from the load carrying leg.

15. An automatically releasable connecting device comprising a unitary device including a vertical support portion terminating at the lower end in a combined engaging and supporting member and terminating at the upper end in an eye for attachment of lifting means, a resiliently operative retractor portion having its upper end integral with said eye and projecting angularly outward from said support portion with the other end continuing into a load carrying portion extending inwardly toward said engaging and supporting member and terminating in a latch portion for cooperation with said combined engaging and supporting member and normally spaced therefrom and being manually movable to cooperative position and brought into cooperation by application of a load to said latch portion for retaining the latch portion while the load is maintained, termination of reaction of the load on the latch portion freeing the latch portion from the combined engaging and supporting member for retraction by said retractor portion to free the load.

16. An automatically releasable disconnecting device comprising a continuous strip of resilient material formed to substantially triangular form when in closed position, and including a vertical support leg terminating at its lower end in a loop having a bottom cross member, with the upper end continuing into an angularly related retractor leg and thence continuing into a load carrying leg turned inwardly toward the support leg and terminating in a latch portion normally retained in spaced relation to said loop through the inherent resiliency of the device, application of a load to the load carrying leg adjacent to said latch portion followed by insertion of the latch portion through the loop followed by support of the load causing the latch portion to engage over said cross member, and freeing of the weight of the load resulting in freeing of the latch portion from the cross member and retraction from the loop to free the load through retraction by said retractor leg.

17. A structure as defined in claim 16, an eye formed at the juncture of the support leg and the retractor leg for connection of lifting means, and a coil formed at the juncture of the retractor leg and the load carrying leg to increase the resiliency of the device.

References Cited in the file of this patent

UNITED STATES PATENTS

| | | |
|---|---|---|
| 700,208 | Lafo et al. | May 20, 1902 |
| 1,079,297 | Jacques | Nov. 18, 1913 |
| 1,090,867 | Longshore | Mar. 24, 1914 |
| 1,286,622 | Henrikson | Dec. 3, 1918 |
| 1,415,490 | Smith | May 9, 1922 |
| 1,675,896 | Lyda | July 3, 1928 |
| 1,907,655 | Parris | May 9, 1933 |
| 2,359,588 | Shea | Oct. 3, 1944 |
| 2,416,568 | Blenden | Feb. 25, 1947 |
| 2,733,537 | Elsberg | Feb. 7, 1956 |

FOREIGN PATENTS

| | | |
|---|---|---|
| 579,591 | France | Aug. 6, 1924 |